United States Patent [19]

Berner

[11] 4,432,713
[45] Feb. 21, 1984

[54] MACHINE FOR THE CONTINUOUS MOLDING OF POLYSTYRENE

[76] Inventor: Rolf E. Berner, R.D. #6, New Castle, Pa. 16103

[21] Appl. No.: 409,934

[22] Filed: Aug. 20, 1982

[51] Int. Cl.³ .............................................. B29D 27/00
[52] U.S. Cl. ...................................... 425/4 C; 264/51; 264/338
[58] Field of Search ........................... 264/51, 53, 338; 425/4 C

[56] References Cited

U.S. PATENT DOCUMENTS

| Re. 27,964 | 4/1974 | Berner | 264/51 |
|---|---|---|---|
| 3,383,441 | 5/1968 | Norrhede et al. | 264/51 |
| 3,408,690 | 11/1968 | Jacob | 425/4 C |
| 3,422,178 | 1/1969 | Junker et al. | 264/51 X |
| 3,594,461 | 7/1971 | Jacob | 264/51 |
| 3,971,838 | 7/1976 | Yazawa | 264/51 |
| 3,986,918 | 10/1976 | Berner | 264/51 X |

Primary Examiner—Philip E. Anderson
Attorney, Agent, or Firm—Robert D. Yeager

[57] ABSTRACT

An improved machine for the continuous molding of polystyrene is described in which granules of polystyrene containing a heat-activated expansion agent are converted into a coherent agglutinated body. The machine includes an open ended molding chamber having an inlet end and an outlet end. The pre-expanded polystyrene granules enter the molding chamber through the inlet end of the molding chamber and continuously move through the chamber. As the polystyrene granules move through the chamber they are subjected to heat to cause their expansion. The improved molding chamber includes interior wall surface portions that operate to limit the expansion of the polystyrene granules in order to produce a dimensionally stable cross section in the agglutinated body. At least a portion of the interior wall surface portions are stationary. The polystyrene granules are moved continuously through the molding chamber by apparatus that includes at least one belt in contact with the moving polystyrene having a working segment spanning the inlet and outlet ends of the molding chamber. The apparatus associated with the stationary wall surface portion is adapted to permit free sliding movement of the agglutinated body through the molding chamber.

10 Claims, 4 Drawing Figures

MACHINE FOR THE CONTINUOUS MOLDING OF POLYSTYRENE

BACKGROUND OF THE INVENTION

1. Field of the Invention

The invention relates generally to a machine for the continuous molding of polystyrene and more particularly to improvements in such a machine wherein the apparatus for moving the polystyrene granules through the molding chamber does not define the molding chamber or limit the expansion of the polystyrene as the polystyrene granules move through the molding chamber.

2. Description of the Prior Art

Workers in the art have developed a variety of machines for the continuous molding of polystyrene granules in which granules of polystyrene containing a heat-activated expansion agent are converted into a coherent agglutinated body. In some cases, such a machine includes an open ended molding chamber. The pre-expanded polystyrene granules enter the molding chamber through the inlet end of the molding chamber and continuously move through the chamber. As the polystyrene granules move through the chamber they are subjected to heat to cause their expansion. The molding chamber operates to limit the expansion of the polystyrene and form it into a coherent agglutinated body having a generally rectangular cross section.

Norrhede et al. U.S. Pat. No. 3,383,441 and Jacob U.S. Pat. No. 3,408,690 disclose one type of continuous molding machine having a horizontal molding chamber defined by the surfaces of two opposed endless belts. A major drawback to the use of machines is that the endless belts which move the polystyrene granules through the molding chamber define the molding chamber and limit the expansion of the polystyrene granules. Thus, the endless belts must be rigid and cumbersome and require complex drive and guide mechanisms to operate properly. Generally, these belts are formed of stainless steel in either a perforated band or chain-link form. In addition, these machines are not thermally efficient because steam can leak from the molding chambers at the locations of the guides for the endless belts and at the steam chest. Because the endless belts in these machines are rigid, they cannot shape the cross section of the final product into anything other than a rectangle.

Berner U.S. Pat. No. Re. 27,964 teaches a second type of continuous molding machine wherein the molding chamber is defined by the surfaces of a rotating wheel and a stationary wall or plate. However, the polystyrene granules occasionally tend to adhere to the surface of the stationary wall or plate due to static electric charges that build up between the surfaces of the beads and the surfaces of stationary wall or plate.

Peille U.S. Pat. Nos. 3,880,559 and Re. 29,416 teach machines for the continuous molding of polyurethane. The machines include two endless belts for moving the polyurethane through the molding chamber that in part mold the polyurethane. The former machine includes rigid plates and the latter flexible mats for shaping the polyurethane. However, the machines disclosed by Peille would not satisfactorily mold polystyrene. Normally, polystyrene expansion causes pressures of between 10 and 20 psi to be exerted on the walls of the molding chamber. These pressures are much greater than those exerted by polyurethane as it expands. Thus, a molding chamber that confines polyurethane as it expands would not necessarily confine expanding polystyrene.

Accordingly, it is desirable to provide a machine for the continuous molding of polystyrene wherein the apparatus for moving the polystyrene granules through the molding chamber does not define the molding chamber or limit the expansion of the polystyrene as the polystyrene granules move through the molding chamber. Thus, the apparatus for moving the polystyrene granules through the molding chamber can be a flexible belt that would obviate the need for complex guide and drive mechanisms. Because belts are flexible, they can conform to the shape of the molding chamber and, thus, enable the final product to have a nonrectangular cross section.

SUMMARY OF THE INVENTION

The present invention provides an improved machine for the continuous molding of polystyrene in which granules of polystyrene containing a heat-activated expansion agent are converted into a coherent agglutinated body. The machine includes an open ended molding chamber having an inlet end and an outlet end. The pre-expanded polystyrene granules enter the molding chamber through its inlet end and continuously move through the chamber. As the polystyrene granules move through the chamber they are subjected to heat to cause their expansion. The improved molding chamber includes interior wall surface portions that operate to limit the expansion of the polystyrene granules in order to produce a dimensionally stable cross section in the agglutinated body. At least a portion of the interior wall surface portions are stationary. The polystyrene granules are moved continuously through the molding chamber by apparatus that includes at least one belt in contact with the moving polystyrene having a working segment spanning the inlet and outlet ends of the molding chamber. The moving apparatus associated with the stationary wall surface portion is adapted to permit free sliding movement of the agglutinated body through the molding chamber.

Preferably, the moving polystyrene granules are exposed to a source of pressurized steam in order to heat them and cause their expansion. The belts may be porous so that steam can penetrate the belts and come in contact with the polystyrene granules. The stationary wall surface portions may be coated with a material such as polytetrafluoroethylene commercially available under the trademark "Teflon" to minimize the frictional forces associated with the sliding movement of the polystyrene through the molding chamber. The interior wall surface portions may be formed to shape the polystyrene into a coherent agglutinated body having a nonrectangular cross section.

In one embodiment, the machine includes a pair of flexible endless belts for moving the polystyrene granules through the molding chamber having working segments in a substantially confronting relationship, which move in the same direction and span the inlet and outlet ends of the molding chamber. The return segments of the endless belts may be in a degree of tension that permits the portions of the working segments passing into the inlet end to conform to the surface contours of the interior wall surface portions of the molding chamber. All of the interior wall surface portions of such a machine may be rigid and stationary.

In a second embodiment, the machine includes one flexible endless belt for moving the polystyrene granules through the molding chamber having its working segment in a substantially confronting relationship with and moving in the same direction as the working segment portion of the surface of a rotating wheel. Thus, in the second embodiment, the interior wall surface portion formed by the surface of the rotating wheel is rigid, but not stationary.

DETAILED DESCRIPTION OF THE PREFERRED EMBODIMENTS

Figure 1:
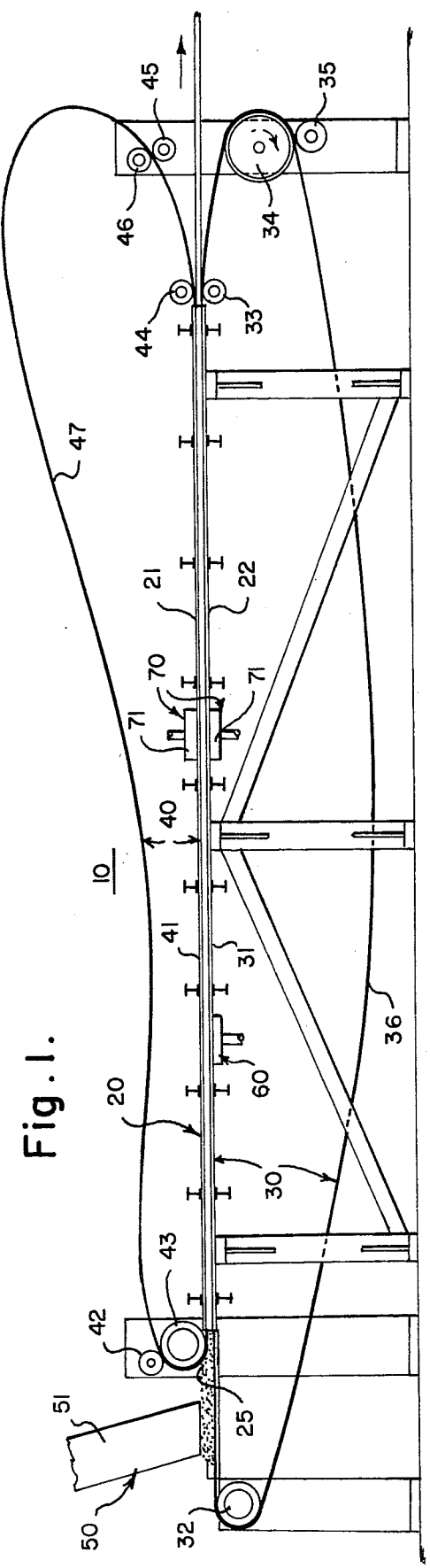
FIG. 1 is a side elevational view of an improved machine for molding polystyrene constructed according to the teachings of the present invention.
Figure 3:
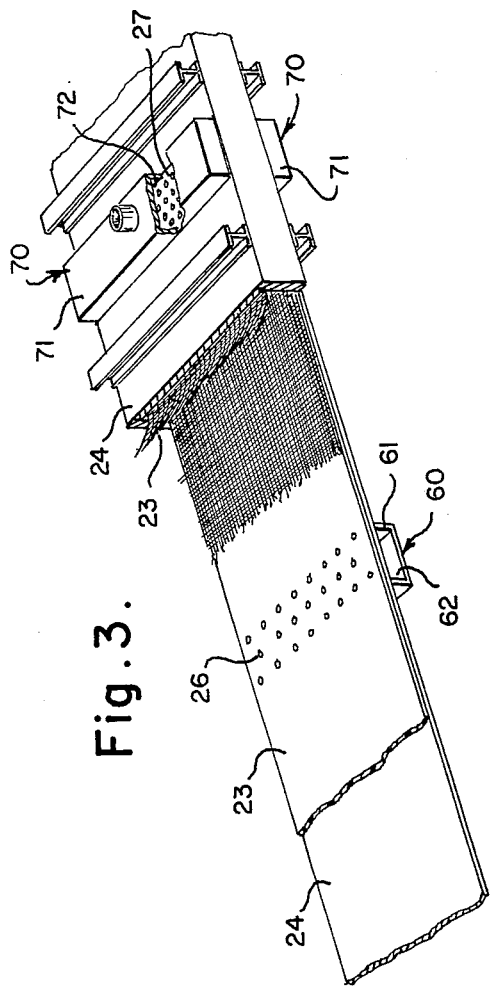
FIG. 3 is an isometric view of a portion of the molding machine shown in FIG. 1.
Figure 2:
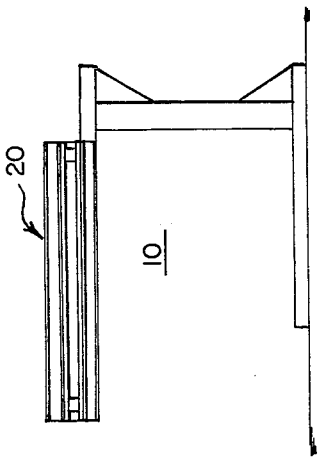
FIG. 2 is an end elevational view of the molding machine shown in FIG. 1.

The improved machine for molding polystyrene, shown in FIGS. 1, 2 and 3 and generally indicated by the reference numeral 10, includes molding chamber 20, flexible endless belts 30 and 40, a source of pre-expanded polystyrene beads 50, steam chest 60 and a cooling area 70.

Molding chamber 20 is formed of upper and lower sheets 21 and 22, respectively. Sheets 21 and 22 are formed of an inner layer 23 of a material, preferably polytetrafluoroethylene, that permits free sliding movement of the polystyrene through the molding chamber, and an outer layer 24, which may be formed of aluminum. Molding chamber 20 is stationary with respect to the moving polystyrene. Sheets 21 and 22 are rigid and are strong enough to withstand the pressure exerted by the polystyrene granules as they expand and mold the expanding polystyrene granules into a cohered agglutinated body. Molding chamber 20 can be shaped in any of a variety of configurations to enable the final product to have a nonrectangular cross section.

Molding chamber 20 includes inlet end 25 in communication with a source of pre-expanded polystyrene granules 50 and an outlet end from which a cohered agglutinated board of polystyrene exits molding chamber 20. Sheet 22 includes perforations 26 in communication with steam chest 60. Sheet 21 may include perforations 26 if the polystyrene board formed in molding chamber 20 is thick enough so that steam cannot penetrate the polystyrene effectively if introduced from only one side of molding chamber 20. Sheets 21 and 22 include perforations 27 in communication with cooling area 70.

The pre-expanded polystyrene granules are transported through molding chamber 20 on perforated flexible endless belts 30 and 40. Endless belt 30 moves underneath the polystyrene and above lower portion 22 of molding chamber 20. Working segment 31 of belt 30 passes over pipe 32, through molding chamber 20, over idler 33 and between driven rollers 34 and 35. The portion of working segment 31 of belt 30 disposed between inlet end 25 of molding chamber 20 and steam chest 60 is preferably in a degree of tension to enable the portion of belt 30 confronting lower portion 22 to assume the configuration of portion 22. Return segment 36 of belt 30 is not in tension.

Endless belt 40 moves underneath upper portion 21 of molding chamber 20 and over the polystyrene. Working segment 41 of belt 40 passes between braker roller 42 and pipe 43, through molding chamber 20, under idler 44 and between rollers 45 and 46. Rollers 45 and 46 may be either idler rollers or driven rollers depending upon the thickness of the polystyrene board being formed. The portion of working segment 41 of belt 40 disposed between inlet end 25 of molding chamber 20 and steam chest 60 is preferably in a degree of tension to enable the portion of belt 40 confronting upper portion 21 to assume the configuration of portion 21. Return segment 47 of belt 40 is not in tension.

If the polystyrene board being formed in molding chamber 20 is thick, machine 10 may include endless belts that run through molding chamber 20 along the surface of the sides of molding chamber 20 so that the board does not stick to the side surfaces of molding chamber 20 as it passes through molding chamber 20.

Source of polystyrene granules 50 includes a bag 51 having an inlet for accepting pre-expanded polystyrene granules and an outlet in communication with inlet end 25 of molding chamber 20.

Molding chamber 20 is provided with a steam chest 60. Steam chest 60 includes bar 61 having a hollow portion 62. Bar 61 extends across molding chamber 20 underneath portion 22 and may be secured to portion 22 of molding chamber 20 by bolts. Hollow portion 62 is connected to a source of steam (not shown). Hollow portion 62 is in communication with perforations 26 in sheet 22 of molding chamber 20. It may be necessary for steam chest 60 to include a bar similar to bar 61 placed above portion 21 of molding chamber 20 if the polystyrene board being formed in molding chamber 20 is thick enough so that steam cannot penetrate the polystyrene effectively from only one side of molding chamber 20.

Molding chamber 20 is provided with cooling area 70. Cooling area 70 includes bars 71, each having a hollow portion 72. Bars 71 extend across molding chamber 20 underneath portion 22 and above portion 21 downstream of steam chest 60. Bars 71 may be secured to portions 21 and 22 by bolts. Hollow portions 72 are connected to a source of pressurized air (not shown). Alternately, portions 72 can be connected to a vacuum pump. Hollow portions 72 are in communication with perforations 27 in sheets 21 and 22 of molding chamber 20.

Machine 10 operates as follows. Pre-expanded polystyrene beads are fed to inlet end 25 of molding chamber 20 from bag 51 by endless belt 30. As endless belts 30 and 40 transport the beads through molding chamber 20, the beads are exposed to steam from steam chest 60 to cause their expansion. The expansion of the beads is limited by molding chamber 20. The expanded polystyrene is then exposed to pressurized air from cooling area 70 to cool the polystyrene sufficiently so that it does not deform after it exits molding chamber 20. The pressurized air must be introduced into cooling area at a pressure less than the molding pressure so that the air will flow towards the outlet end of molding chamber 20. The air provides a cushioning effect and reduces the friction between the belt 30 and 40 and surfaces 21 and 22 of molding chamber 20.

Figure 4:
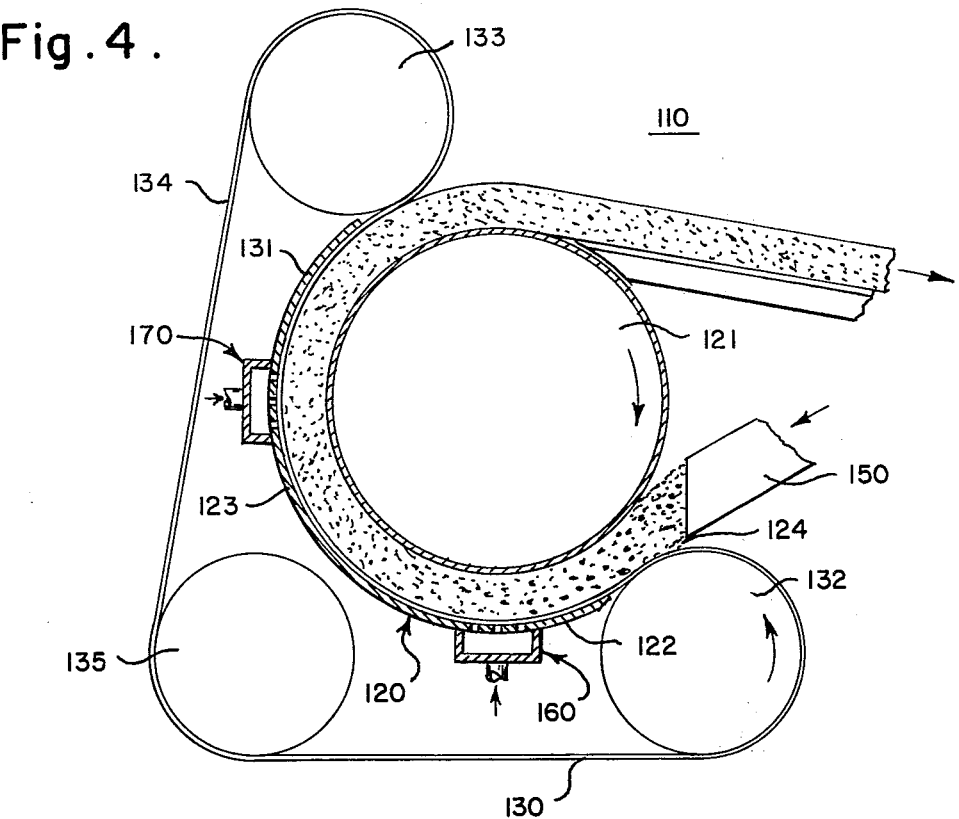
FIG. 4 is a side elevational view of a second embodiment of the present invention.

A second embodiment 110, shown in FIG. 4, includes molding chamber 120 formed by a portion of the surface of rotating wheel 121 and a portion of the surface 122 of housing 123. Rotating wheel 121 may be driven by any known means. The surface of rotating wheel 121 may be covered with the material from which perforated endless belt 130 is formed so that the texture of the surface of rotating wheel 121 is the same as that of endless belt 130. Thus, the texture of both sides of the polystyrene board formed in molding chamber 120 is the same.

Surface 122 of housing 123 which may be formed of aluminum and may include a coating of polytetrafluoroethylene. Surface 122 includes perforations in communication with steam chest 160 and perforations in communication with cooling area 170. Polystyrene beads enter molding chamber 120 through inlet end 124.

Perforated endless belt 130 aids in transporting the pre-expanded polystyrene granules through molding chamber 120. Working segment 131 of endless belt 130 passes over driven roller 132, through molding chamber 120 and over pipe 133. Return segment 134 of endless belt 130 passes from pipe 133, under pipe 135 and back to roller 132. Working segment 131 of endless belt 130 is preferably in a degree of tension to enable the portion of belt 130 confronting wheel 121 to assume the configuration of the surface of the molding chamber 120. Return segment 134 of endless belt 130 is not in tension.

Source of pre-expanded polystyrene beads 150, steam chest 160 and cooling area 170 are formed as are source of pre-expanded polystyrene beads 50, steam chest 60 and cooling area 70 described above, respectively.

Machine 110 operates as follows. Pre-expanded polystyrene beads are fed to inlet end 124 of molding chamber 120 from source of pre-expanded polystyrene beads 150. Endless belt 130 transports the beads through molding chamber 120 the beads are exposed to steam from steam chest 160 to cause their expansion. The expanded polystyrene is then exposed to pressurized air from cooling area 170 to cool the polystyrene sufficiently so that it does not deform after it exits molding chamber 120.

In a third embodiment of the present invention, a horizontal molding chamber may be formed so that the polystyrene granules are molded into a tubular configuration. The machine operates in a manner similar to machine 10 except that the outer housing of the molding chamber has a circular cross section. A circular rod, preferably formed of polytetrafluoroethylene extends through the center of the molding chamber in order to form the hollow portion of the tube. A ring, disposed in front of the inlet end of the molding chamber, causes the endless belt to take the shape of the molding chamber. The polystyrene beads are blown into the molding chamber by pressurized air in order to obtain an even distribution of beads along the cross section of the tube.

What is claimed is:

1. In apparatus for the continuous molding of polystyrene, wherein granules of polystyrene containing a heat-activated expansion agent are converted into a coherent agglutinated body, of the type having an open-ended molding chamber with an inlet end and an outlet end, means for feeding said polystyrene granules to said inlet end of said chamber, means for continually moving said polystyrene through said molding chamber, and means for subjecting said moving polystyrene granules to heat to cause their expansion, the improvement comprising:

said molding chamber having stationary interior wall surface portions that operate to limit the expansion of said polystyrene granules in order to produce a dimensionally stable cross-section in said agglutinated body;

said continually moving means including at least one endless belt having a working segment confined within said molding chamber and a return segment subjected to substantially no longitudinal tensile force; and means associated with said stationary wall surface portions that are in direct contact with said agglutinated body for minimizing the frictional forces presented by said stationary wall surface portions.

2. Apparatus for the continuous molding of polystyrene as recited in claim 1 wherein said moving polystyrene granules are exposed to a source of pressurized steam in order to heat them and cause their expansion.

3. Apparatus for the continuous molding of polystyrene as recited in claim 2 wherein said belt of said continually moving means is porous so that the steam can penetrate said belt and come in contact with said polystyrene granules.

4. Apparatus for the continuous molding of polystyrene as recited in claim 1 wherein said stationary wall surface portions that are in direct contact with said agglutinated body are coated with polytetrafluoroethylene to permit free sliding movement of said polystyrene through said molding chamber.

5. Apparatus for the continuous molding of polystyrene as recited in claim 1 wherein said stationary interior wall surface portions of said molding chamber are formed to shape said polystyrene into a coherent agglutinated body having a nonrectangular cross section.

6. Apparatus for the continuous molding of polystyrene as recited in claim 1 wherein the expanded polystyrene is exposed to a source of pressurized air introduced into said molding chamber at a pressure less than the molding pressure in order to cool said expanded polystyrene and to reduce the frictional forces between said belt and said molding chamber.

7. Apparatus for the continuous molding of polystyrene as recited in claim 1 wherein said endless belt possesses sufficient flexibility to permit said working segment to conform to the surface contours of said molding chamber.

8. Apparatus for the continuous molding of polystyrene as recited in claim 1 wherein said continually moving means further includes a second endless belt having a working segment confined within said molding chamber and a return segment subjected to substantially no longitudinal tensile force.

9. Apparatus for the continuous molding of polystyrene as recited in claim 8 wherein said working segments of said first and second belts are in a substantially confronting relationship, move in the same direction, and span the inlet and outlet ends of said molding chamber.

10. Apparatus for the continuous molding of polystyrene as recited in claim 9 wherein said first and second endless belts possess sufficient flexibility to permit their respective working segments to conform to the surface contours of said molding chamber.

* * * * *